United States Patent Office 2,900,403
Patented Aug. 18, 1959

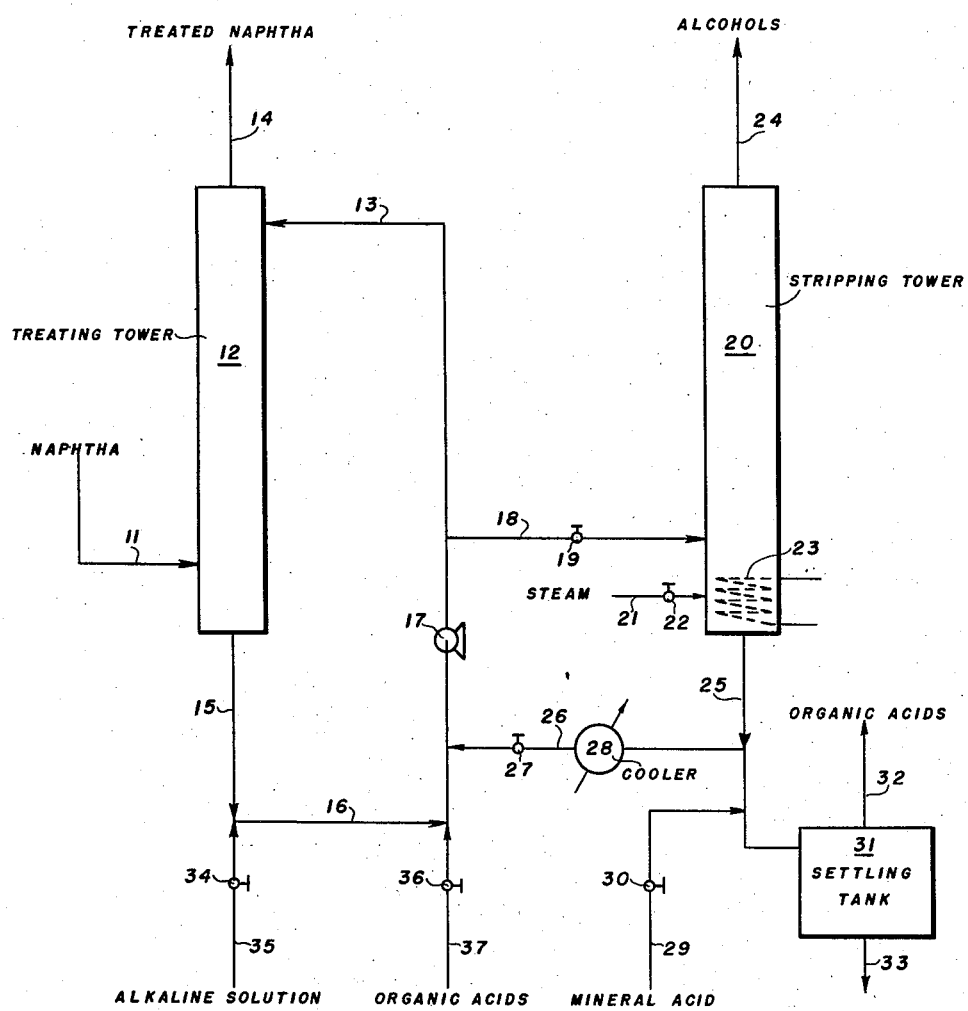

2,900,403

REMOVAL OF OXYGENATED COMPOUNDS FROM NAPHTHA

Joseph T. Horeczy and Edward F. Wadley, Baytown, Tex., assignors to Esso Research and Engineering Company, a corporation of Delaware Application August 29, 1956, Serial No. 606,912

5 Claims. (Cl. 260—450)

The present invention is directed to a method for removing oxygenated organic compounds from hydrocarbons containing them. More particularly, the invention is directed to the treatment of hydrocarbons obtained by reacting carbon monoxide and hydrogen in the presence of a catalyst.

This application is a continuation-in-part of Serial No. 357,574, filed May 26, 1953, now abandoned, which in turn is a division of Serial No. 788,231, filed November 26, 1947 in the names of Edward F. Wadley and Joseph T. Horeczy, entitled "Removal of Oxygenated Organic Compounds from Hydrocarbons" now Patent No. 2,661,362.

The pioneering work by Fischer and Tropsch resulted in a process for producing hydrocarbons and oxygenated organic compounds from carbon monoxide and hydrogen by passing a mixture thereof over a suitable catalyst to cause a reaction between the materials. As a result of this work, commercial processes have been developed to produce hydrocarbons and oxygenated organic compounds from carbon monoxide and hydrogen. The product from this synthesis reaction is a synthetic crude petroleum, but, unlike natural crude petroleum, it may contain a considerable quantity of oxygenated organic compounds such as the ketones, aldehydes, organic acids, esters, and various other oxygenated hydrocarbon derivatives. These oxygenated organic compounds in themselves are valuable materials, but, in combination with hydrocarbons, they are objectionable since the hydrocarbons are contaminated by the oxygenated organic compounds and, therefore, are unsuitable for use in the various petroleum conversion processes where catalysts are employed.

The reason that the synthetic hydrocarbons produced by the reaction of carbon monoxide and hydrogen and contaminated with oxygenated organic compounds are unsuitable in catalytic conversion processes is that the oxygenated organic compounds react with the catalyst usually employed, such as the Friedel-Crafts type catalyst. Not only do the oxygenated organic compounds react with the catalyst but they enter into reaction with the hydrocarbons and produce products of a less attractive nature than the product resulting from the catalytic conversion of the hydrocarbons themselves. For example, polymers having lubricating oil qualities may be produced by polymerizing alpha olefins in the presence of aluminum chloride, but, if these alpha olefins are contaminated with oxygenated organic compounds, as when produced from carbon monoxide and hydrogen, the product is not satisfactory in that the lubricating oil qualities are depreciated by the presence of the oxygenated organic compounds. Furthermore, the oxygenated organic compounds react with the catalyst and destroy its activity requiring considerably larger quantities of catalyst to cause the reaction to proceed than would be required if the oxygenated organic compounds were absent.

The problem of removing oxygenated organic compounds from naphthas formed by the reaction of carbon monoxide and hydrogen has long been recognized and numerous suggestions have been made for removing these compounds. The prior art proposals have included treatment of the naphthas with an adsorbent such as silica gel, solvent extraction with aqueous methanol, and various other solvents such as sulfur dioxide and the like and mixtures thereof. It has also been suggested to remove a portion of the oxygenated organic compounds by treatment of the naphtha with various chemical reagents. It has also been known to treat compounds including hydrocarbons and oxygenated organic compounds with aqueous solutions of alkali metal hydroxide to remove oxygenated organic compounds therefrom. The prior art proposals have largely been unsatisfactory in that, while they are effective in removing a portion of the oxygenated organic contaminants in the naphtha, they are largely ineffective in substantially completely removing the oxygenated organic compounds.

It is, therefore, the object of the present invention to provide a process for removing oxygenated organic compounds from naphthas containing them.

We have now discovered that the oxygenated organic compounds in hydrocarbon mixtures, such as produced by the synthesis of carbon monoxide and hydrogen, may be removed from the synthetic naphthas by subjecting the naphtha containing the oxygenated organic compounds to a treating operation including a treatment with an aqueous solution of an alkali metal hydroxide to which has been added or which contains certain low molecular weight aromatic sulfonic acids. It is to be understood that the alkali metal hydroxide functions to form the corresponding sulfonic acid salt, i.e., sodium sulfonate. Alternatively the salt may be prepared first and added as such.

The present invention involves treating the naphtha with an alkaline solution containing the sulfonic acid to remove effectively organic acids contained therein and alcohols, leaving the naphtha substantially free of these compounds. The naphtha is separated from the treating solution and then may be used in catalytic conversion operations such as polymerization and alkylation and the like. The separated solution containing dissolved acids may be recycled to treat additional quantities of the contaminated naphtha wholly or in part. Preferably, in order to recover the desirable alcohols and organic acids contained in the fattened solution, only a portion of the treating solution containing the dissolved acids and alcohols is recycled to contact with additional quantities of the naphtha and another portion is withdrawn and subjected to a steam stripping operation for recovery of the alcohols. After being stripped of alcohols, the stripped aqueous solution of alkali metal hydroxide-sulfonic acid may be divided into two portions, with one portion being cooled and returned to treat additional quantities of the contaminated naphtha while the other portion may be acidified with a mineral acid to recover the dissolved acids.

The alkaline solution employed as a treating reagent may be an aqueous solution of an alkali metal hydroxide, or it may be an aqueous solution of an alkali metal carbonate. The hydroxides and carbonates of the alkali metals, such as lithium, sodium, and potassium, may be suitably employed in the practice of the present invention. Preferably, it will be desired to employ an aqueous solution of an alkali metal hydroxide containing an amount of alkali metal hydroxide in the range from about 5% to about 20%. A solution containing 15% of sodium hydroxide gives very good results.

The temperatures employed in the practice of the present invention in which the contaminated naphtha containing oxygenated organic compounds is contacted with an aqueous alkaline solution to which has been added an organic carboxylic acid will usually include temperatures in the range from about 60° F. to 120° F. with temperatures in the preferred range from about 80° F. to 100° F.

In order to remove the alcohols from the fattened solution, it will be desired to strip the fattened solution with open steam at a temperature in the range from 212° F. to 350° F., depending on the pressure employed on the system. It will be understood that in the treating step a suitable pressure may be imposed to maintain a liquid phase condition.

The invention will now be further illustrated by reference to the drawing in which the sole figure represents a flow sheet of a preferred mode of practicing the present invention. Referring now to the drawing, numeral 11 designates a charge line through which a naphtha fraction boiling in the range between 100° F. and 400° F., produced by the synthesis of carbon monoxide and hydrogen over a catalyst, is introduced into the system. The naphtha fraction introduced by line 11 contains olefins, paraffins, and naphthenes and may be contaminated with oxygenated organic compounds including ketones, alcohols, aldehydes, organic acids, esters, and the like. While the primary purpose of this invention is to remove the carboxylic acids and alcohols, the ketones, aldehydes and esters are also removed. The naphtha is introduced into a treating tower 12 which may suitably be a tower equipped with internal baffling arrangements, such as bell cap plates, which will allow intimate contact between one liquid and another liquid. The alkaline solution, such as a solution of sodium hydroxide and water, having a concentration of sodium hydroxide of about 15% and containing approximately 10% of a water soluble sulfonic acid or mixture of acids containing the sulfonic acids, is introduced into treating tower 12 by line 13. The alkaline solution containing the organic sulfonic acid flows downwardly in treating tower 12 and contacts countercurrently the ascending hydrocarbons. The hydrocarbons, substantially free of organic acids and alcohols, and other oxygenated contaminants leave treating tower 12 by line 14 and may then be used as a feed stock for a catalytic conversion operation, such as a polymerization operation employing a Friedel-Crafts type catalyst. The fattened solution containing the original dissolved sulfonic acid and including alcohols and organic acids removed from the contaminated naphta is withdrawn from treating tower 12 by line 15 and is recycled in part to treating tower 12 by way of branch line 16 which meets line 13. Pump 17 forces the solution back into the top of tower 12. A portion of the fattened solution containing dissolved organic acids and alcohols may be routed by way of line 18 controlled by valve 19 to a stripping tower 20. Striping tower 20 is provided with a line 21 controlled by valve 22 by way of which open steam may be introduced thereto. Stripping tower 20 is also provided with a heating means 23 which may either be an internal or external reboiler.

In stripping tower 20, conditions are adjusted which will include a temperature in the range between 212° F. and 350° F., depending on the pressure, to remove overhead by line 24 alcohols which were dissolved in the fattened solution. While not shown in the drawing, the fraction withdrawn by line 24 will also include water and alcohols and should be subjected to a cooling treatment to condense these materials for recovery thereof. While not illustrated in the drawing, it may be desirable to provide stripping tower 20 with a line through which water may be introduced to maintain the proper concentration of water in the solution. Otherwise, the solution may become depleted of water if water is not added.

The substantially alcohol-free aqueous alkaline solution containing the dissolved organic acids and the acids originally added is discharged from stripper 20 by line 25 and split into two streams. One stream flows through line 26, controlled by valve 27, after cooling in cooler 28 into line 13 for recycling to treating tower 12 as a treating reagent, as has been described.

The other portion discharges by way of line 25, after acidification with a mineral acid introduced by line 29 and which is controlled by valve 30, into a settling tank 31 wherein a separation between organic acids and the salt solution is made, the organic acids separating as a top layer. The organic acids may be withdrawn from tank 31 by line 32 for addition of a portion thereof to the treating solution, as will be described, or it may be used as such as a starting point in numerous organic syntheses. The salt solution may be discharged from the system by line 33.

To compensate for the solution which is acidified and subsequently discharged from the system by line 33, it will be necessary from time to time to add make-up alkaline solution. Under these conditions, it will be convenient to add the make-up alkaline solution by opening valve 34 in line 35 which meets with line 15 and connects into branch line 16 and allows the make-up alkaline solution to recycle to treating tower 12 as has been described. At the beginning of the operation in accordance with the present invention, the treating solution introduced by line 13 will not contain any of the agents which will promote the solubility of the orangic acids and alcohols in the aqueous alkaline solution. Therefore, from time to time it may be necessary to augment the supply of sulfonic acids by opening valve 36 in line 37 connecting the system to a supply of these materials, not shown.

The sulfonic acids or the salts thereof which are especially effective in the removal of oxygenated contaminants from naphtha fractions can be classified as aromatic sulfonic acids which when neutralized form water soluble salts or the salt per se. The aforesaid class of compounds is a small one since the higher molecular weight aromatic sulfonates, e.g. $C_{20}$ alkyl benzene sulfonate, do not have sufficient water solubility to effect the solubilization of the alcohols and acids. Specific examples of the preferred sulfonic acids include benzene sulfonic acid, toluene sulfonic acid, xylene sulfonic acid, naphthalene sulfonic acid, cymene sulfonic acid and the like. The cation employed to make the water soluble salts include the alkali metals, i.e. K, Na, Li as well as the ammonium or amine radicals. The salts may be employed as such or form in situ by contacting an aqueous alkaline solution with the proper amounts of sulfonic acid.

Although the aforementioned sulfonic acids are well known and there are various processes of preparing them, a convenient source of these acids is from the acid sludge obtained by treating a petroleum fraction, e.g. a lubricating oil fraction having a viscosity of about 75 SSU at 100° F. with strong, e.g. 100 weight percent sulfuric acid. The acid sludge thus obtained is then hydrolyzed wtih sufficient water to yield a weak aqueous sulfuric acid bottom layer and a top layer of green sulfonic acid and oil. After additional water dilution the oil is removed by extracting with an aromatic solvent such as benzene. The remaining sulfonic acid may then be used in the manner described above to aid in the extraction of oxygenated contaminants. It is to be understood that the particular source for the water soluble aromatic sulfonates does not form a critical part of this invention, however the sulfonates derived from petroleum fractions as indicated above and herein referred to as water soluble "petroleum sulfonates" are preferred because of their low cost.

The amount of the sulfonic acids added to the aqueous alkaline solution will be in the range from 1% to 20% with a preferred amount of approximately 10%.

It is preferable to contact the contaminated naphtha with 1–20 volumes of the aqueous sulfonate solution that is the volume flow of aqueous sulfonate through line 13 will be 1–20 times that of the naphtha through line 15.

Ratio of solvent to naphtha may vary outside this range depending on the amount of contaminants present and the product purity desired.

As described in conjunction with the drawing, the organic acids will build up in the alkaline solution and it may be desirable to withdraw continuously an amount of the fattened solution from which the alcohols have been removed for acidification with mineral acids for the recovery of organic acids therefrom.

*Example*

A naphtha fraction containing 0.688 millimol per gram of acid and 0.547 millimol per gram of alcohol is treated in a continuous countercurrent manner at a ratio of two volumes of an aqueous solution comprising 15 weight percent of NaOH and 10 weight percent of toluene sulfonic acid per volume of naphtha at 80° F. in a treating tower. The naphtha recovered from the top of the tower is substantially freed of organic acids and alcohols. The fat aqueous toluene sulfonate solution is then passed to a stripping tower and treated with open steam at 250° F. and 30 p.s.i.g. The alcohols are recovered overhead and the alcohol stripped toluene sulfonate solution containing acids is recovered as a bottoms product. The stripped toluene sulfonate after water make-up is recycled with fresh sulfonate solution via line 13. If desired all or any part of the stripped toluene sulfonate solution may be acidified with an inorganic acid, e.g. $H_2SO_4$ to recover the free acids.

The nature and objects of the present invention having been completely described and illustrated, what we wish to claim as new and useful and to secure by Letters Patent is:

1. A method of removing carboxylic acids and alcohols from a naphtha fraction synthesized by the hydrogenation of carbon monoxide containing said carboxylic acids and alcohols in a low content which comprises contacting the hydrocarbon fraction containing said acids and alcohols at a temperature in the range of between 60° and 120° F. with an aqueous solution of a water soluble petroleum sulfonate, which comprises an aromatic petroleum sulfonate, said sulfonate being present in amount between 1 to 20 weight percent calculated as the free acid, removing the aqueous solution from contact with the hydrocarbon fraction, and recovering the hydrocarbon fraction substantially free of carboxylic acids and alcohols.

2. A method in accordance with claim 1 wherein the aqueous solution of petroleum sulfonate is formed by adding from 1 to 20 weight percent of petroleum sulfonic acid to an aqueous solution of 5 to 20 weight percent sodium hydroxide.

3. A method of treating a naphtha fraction synthesized by the hydrogenation of carbon monoxide contaminated with oxygenated organic compounds comprising carboxylic acids, alcohols, ketones and aldehydes which comprises contacting said naphtha fraction at a temperature in the range of 60°–100° F. with an aqueous solution containing 1 to 20 weight percent of a water soluble salt of a petroleum sulfonic acid, which comprises an aromatic petroleum sulfonic acid, to effect the extraction of substantially all of the alcohols and carboxylic acids present in said contaminated feed, separating said aqueous solution containing the carboxylic acids and alcohols derived from said naphtha fraction, dividing the separated solution into first and second portions, contacting additional quantities of said feed naphtha with said first portion to cause substantial removal of carboxylic acids and alcohols from additional quantities of said naphtha, and recovering from said second portion alcohols and acids.

4. A method in accordance with claim 3 wherein the sulfonate is a sodium sulfonate.

5. A method for treating a naphtha fraction synthesized by the hydrogenation of carbon monoxide and being contaminated with a small amount of oxygenated organic compounds comprising carboxylic acids, alcohols, ketones and aldehydes which comprises the steps of contacting said naphtha fraction with an aqueous solution of sodium hydroxide having a concentration in the range of from 5 percent to 20 percent sodium hydroxide and containing a solubility promoting amount in the range of between 1 to 20 weight percent of a petroleum sulfonic acid, which comprises an aromatic petroleum sulfonic acid which will form a water-soluble sodium salt, at a temperature in the range of 60°–120° F. to remove substantially all of the carboxylic acids and alcohols from said naphtha fraction, separating the naphtha fraction from the sodium hydroxide solution, withdrawing the sodium hydroxide solution containing carboxylic acids and alcohols and dividing it into first and second portions, recycling the first portion to contact additional quantities of the feed naphtha fraction and stripping the alcohols from the second portion by contacting said second portion with steam at a temperature of between 212° F. and 350° F. to remove alcohols therefrom, and acidifying the remaining acid-salt mixture to recover acids therefrom.

References Cited in the file of this patent

UNITED STATES PATENTS

| | | |
|---|---|---|
| 1,732,894 | Isham | Oct. 22, 1929 |
| 2,566,311 | Burton et al. | Sept. 4, 1951 |
| 2,685,558 | Hodges | Aug. 3, 1954 |
| 2,687,439 | Garner et al. | Aug. 24, 1954 |
| 2,742,490 | O'Conner et al. | Apr. 17, 1956 |